United States Patent
Yoshii et al.

(10) Patent No.: US 6,212,298 B1
(45) Date of Patent: *Apr. 3, 2001

(54) CHARACTER RECOGNITION APPARATUS, METHOD AND COMPUTER READABLE MEMORY

(75) Inventors: Hiroto Yoshii, Tokyo; Tsunekazu Arai, Tama; Eiji Takasu, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/708,629

(22) Filed: Sep. 5, 1996

(30) Foreign Application Priority Data

Sep. 8, 1995 (JP) .................................................. 7-231217

(51) Int. Cl.$^7$ ............................................. G06K 9/00
(52) U.S. Cl. ............................................. 382/193
(58) Field of Search ............................ 382/174, 179, 382/185, 186, 187, 189, 217, 218, 202, 203, 193, 312, 315

(56) References Cited

U.S. PATENT DOCUMENTS

| | | | |
|---|---|---|---|
| 3,996,557 | * 12/1976 | Donahey | 340/146.3 SY |
| 4,829,583 | * 5/1989 | Monroe et al. | 382/13 |
| 5,438,631 | * 8/1995 | Dai | 382/197 |
| 5,734,750 | * 3/1998 | Arai et al. | 382/202 |

FOREIGN PATENT DOCUMENTS 61-086881  10/1994  (JP) .

* cited by examiner

*Primary Examiner*—Jose L. Couso
*Assistant Examiner*—Brian P. Werner
(74) *Attorney, Agent, or Firm*—Fitzpatrick, Cella, Harper & Scinto

(57) ABSTRACT

A character recognition apparatus is provided with a recognition dictionary that stores the strokes of standard characters in an order that is in accordance with a predetermined rule for deciding the order of each stroke by the positional relationship of each stroke. A plurality of strokes are stored on a storage medium in an order in accordance with the predetermined rule. The plurality of strokes stored on the storage medium and each stroke of the standard characters stored in the recognition dictionary are compared. The character constructed by the plurality of strokes is recognized based upon the results of comparison.

13 Claims, 8 Drawing Sheets

FIG. 8
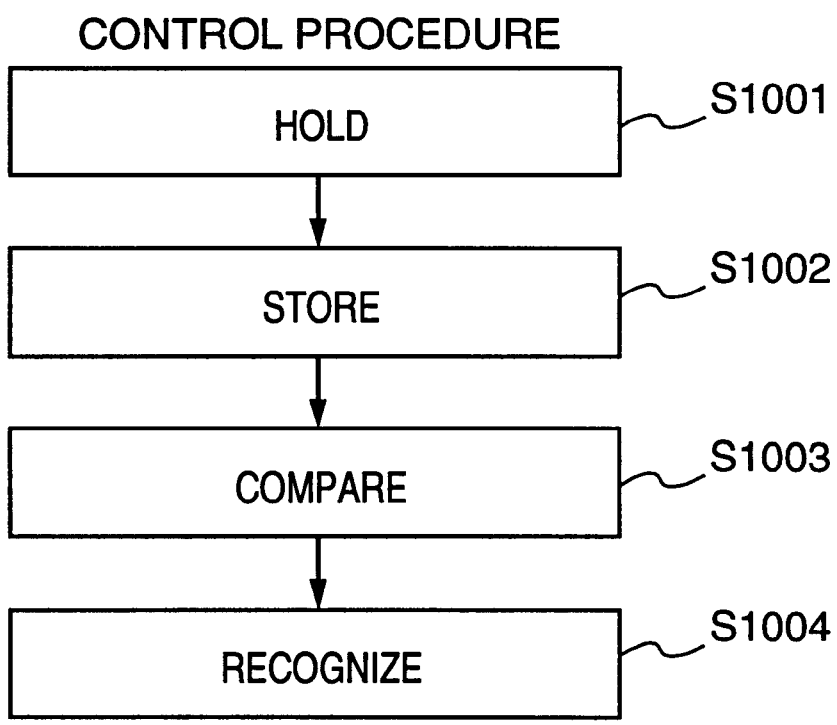
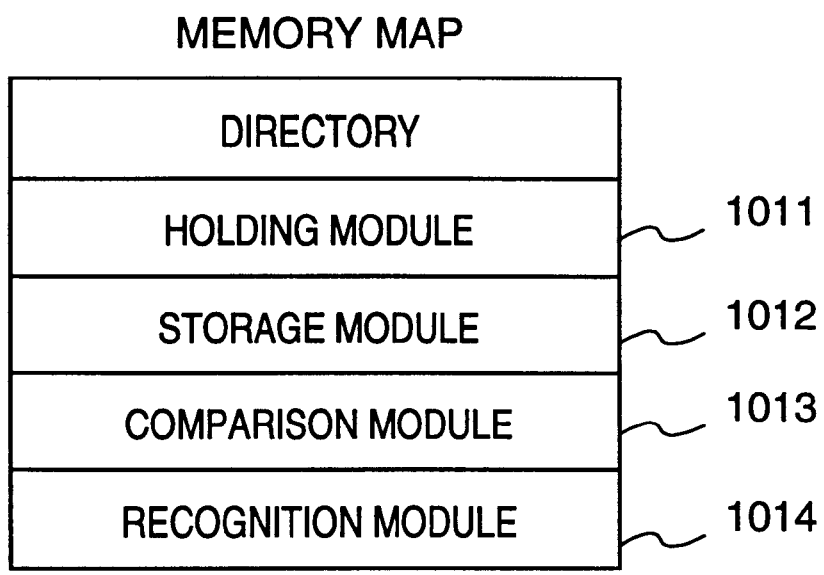

CHARACTER RECOGNITION APPARATUS, METHOD AND COMPUTER READABLE MEMORY

BACKGROUND OF THE INVENTION

This invention relates to a character recognition apparatus, method and computer readable memory for recognizing characters on the basis of a plurality of entered strokes.

In order to realize a character recognition method that is independent of the stroke order of a character in recognition of characters entered using a coordinate input unit such as a digitizer, recognition is carried out by matching each stroke constituting the entered character with a dictionary that has been previously stored in a memory device such as a hard disk. (By way of example, the dictionary stores character codes of standard characters expressed by, say, a table of Chinese characters in common use, and information on the strokes constructing these characters.) Since matching is performed on a stroke-by-stroke basis according to this method, recognition time, which is that required to recognize an entered character, is proportional to the square of the number of strokes of the character.

Accordingly, a method has been proposed, as set forth in the specification of Japanese Patent Publication No. 4-65431, in which the strokes of an entered character are matched with some of the strokes of dictionary strokes (e.g. dictionary strokes corresponding to the number of entered strokes and dictionary strokes over a range of one stroke before to one stroke after a given stroke). Though this method is not perfect, recognition independent of the stroke order is made possible, thereby shortening recognition time.

However, according to the matching method used in character recognition disclosed in Japanese Patent Publication No. 4-65431, basically matching is carried out on the basis of the stroke order of the entered character. Consequently, with regard to a character such as "E" which may be entered by the user in a completely incorrect stroke order, it is not possible to achieve high-speed character recognition that is independent of stroke order.

SUMMARY OF THE INVENTION

An object of the present invention is to provide a character recognition apparatus, method and computer readable memory through which characters can be recognized at high speed and without dependence upon stroke order.

According to the present invention, the foregoing object is attained by providing a character recognition apparatus for recognizing characters based upon an entered plurality of strokes, comprising holding means for holding a dictionary which stores strokes of standard characters in a predetermined order based upon relative positional relationship of the strokes, storage means for storing the plurality of strokes in the predetermined order, comparison means for comparing the plurality of strokes stored in the storage means and each stroke of the standard characters stored in the dictionary, and recognition means for recognizing a character, which is constructed by the plurality of strokes, based upon results of the comparison performed by the comparison means.

In a preferred embodiment, the comparison means compares each stroke of the standard characters stored on the storage medium and a stroke stored in said storage means which corresponds to an order of said each stroke, and an order before and after said order.

In a preferred embodiment, the predetermined order is an order in which prescribed points of a sequence of points constructing each stroke are mapped to a predetermined straight line. By making the mapping to a predetermined straight line, the order of a plurality of strokes entered in two dimensions can be assigned.

In a preferred embodiment, the predetermined order is an order in which the prescribed points are mapped to a prescribed straight line along a predetermined curve.

With regard to an input area in which at least a plurality of strokes are entered, all of a plurality of unit input areas constructing the input area are searched. In a preferred embodiment, the predetermined order is an order in which prescribed points of a sequence of points constructing each stroke of the plurality of strokes are detected.

In a preferred embodiment, the prescribed points include at least one of a starting point, end point, mid-point and centroid of a stroke.

In a preferred embodiment, the predetermined order is an order in which two or more points from a sequence of points constructing each stroke of the plurality of strokes are mapped to a predetermined straight line.

According to the present invention, the foregoing object is attained by providing a character recognition method for recognizing characters based upon an entered plurality of strokes, comprising a holding step of holding a dictionary which stores strokes in a predetermined order based upon relative positional relationship of the strokes, a storage step of storing the plurality of strokes on a storage medium in the predetermined order, a comparison step of comparing the plurality of strokes stored on the storage medium at the storage step and each stroke of the standard characters stored in the dictionary, and a recognition step of recognizing a character, which is constructed by the plurality of strokes, based upon results of the comparison performed by at the comparison step.

According to the present invention, the foregoing object is attained by providing a computer readable memory storing program codes for character recognition processing, the memory comprising a program code of a holding step of holding a dictionary which stores strokes of standard characters in a predetermined order based upon relative positional relationship of the strokes, a program code of a storage step of storing the plurality of strokes on a storage tedium in the predetermined order, a program code of a comparison step of comparing the plurality of strokes stored on the storage medium at the storage step and each stroke of the standard characters stored in the dictionary, and a program code of a recognition step of recognizing a character, which is constructed by the plurality of strokes, based upon results of the comparison performed by at the comparison step.

In accordance with the present invention, as described above, it is possible to provide a character recognition apparatus, method and computer readable memory through which characters can be recognized at high speed independently of stroke order.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram showing the structure of a memory map of a storage medium storing program codes for implementing the embodiments of the invention.

DESCRIPTION OF THE PREFERRED EMBODIMENTS <First Embodiment>

Figure 1:
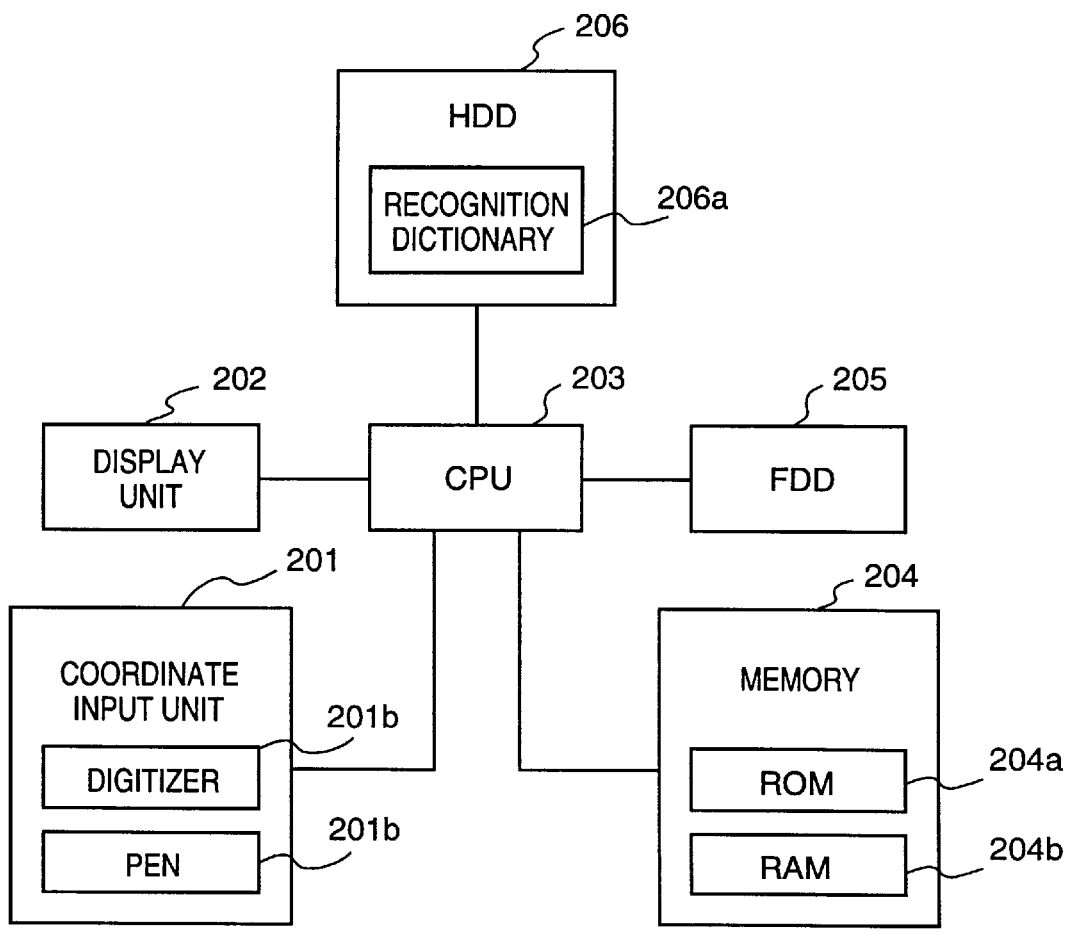
FIG. 1 is a block diagram illustrating the architecture of a character recognition apparatus according to a first embodiment of the present invention.

FIG. 1 is a block diagram illustrating the architecture of a character recognition apparatus according to a first embodiment of the present invention.

As shown in FIG. 1, a coordinate input unit 201 includes a digitizer 201a and a pen 201b. Character and graphic coordinate data can be entered on the digitizer 201a by the pen 201b. The entered coordinate data can be displayed on a display unit 202 under the control of a CPU 203. The display unit 202 comprises a display such as a CRT and displays the coordinate data representing the characters or graphics entered by the coordinate input unit 201 and character data read in from a memory 204 under the control of the CPU 203.

A floppy-disk drive (FDD) 205 accommodates a loaded floppy disk and is capable of writing data to and reading data from the floppy disk. A program for processing (FIG. 2), described below, is written to the loaded floppy disk (not shown) and the processing can be executed by reading the program into a RAM 204b of the apparatus. In the first embodiment, the program is stored in a ROM 204a in advance and the processing (FIG. 2) is executed under the control of the CPU 203.

A hard-disk drive (HDD) 206 incorporates a recognition dictionary 206a, described below, for executing recognition of characters that have been entered from the digitizer 201a. The recognition dictionary 206a is stored on a storage medium such as a hard disk (HD), which is capable of storing a large quantity of data.

The CPU 203 executes the recognition of entered characters and performs various control operations. The memory 204 comprises the ROMs 204a and 204b. The ROM 204a stores a recognition program used in character recognition as well as various control programs. These programs are executed by the CPU 203. The ROM 204a further stores character font information and character codes. The ROM 204b is an area for temporarily storing data read in from a dictionary stored on the hard disk (not shown) accommodated in the hard-disk drive 206, and data representing variables or the like used by the recognition program, or a work area for various data.

The flow of processing executed in the character recognition apparatus according to the first embodiment shown in FIG. 1 will now be described with reference to the flowchart of FIG. 2.

Figure 2:
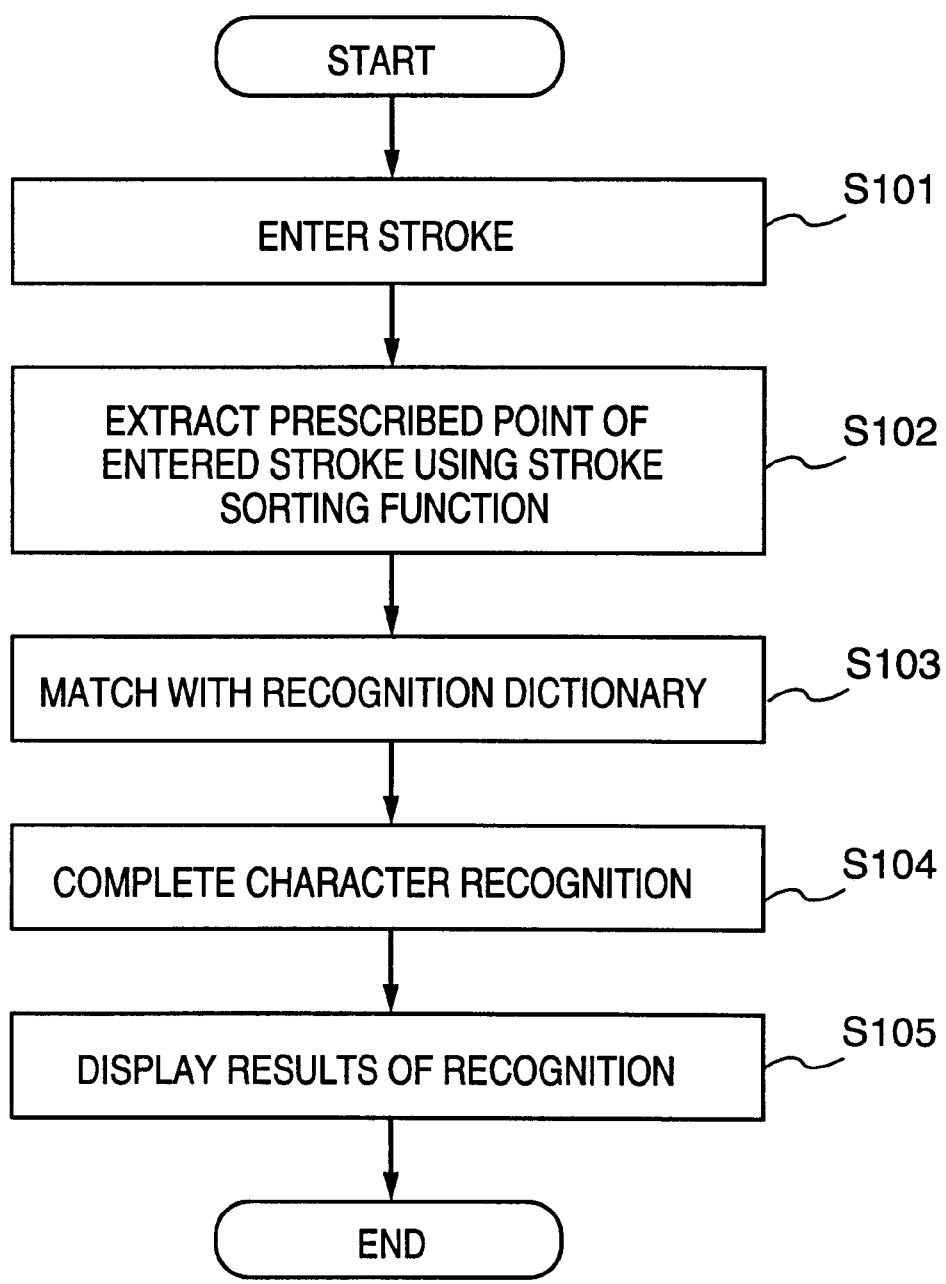
FIG. 2 is a flowchart illustrating the flow of processing according to the first embodiment.

FIG. 2 is a flowchart illustrating the flow of processing according to the first embodiment of the invention.

Strokes are entered from the digitizer 201a at step S101. This is followed by step S102, at which the CPU 203 projects prescribed points of point sequences, which construct the entered strokes, in one dimension in accordance with a stroke sorting function, and assigns the order of the strokes based upon the order of the projections. Each stroke to which an order has been assigned and the order itself are stored in the RAM 204b.

The stroke sorting function is for assigning an order to each stroke based upon the entry position relationship of each stroke entered by the digitizer 201a. However, even if it is possible to assign an order to a point sequence that extends in one dimension, assigning an order to a point sequence (stroke) that extends in continuous two-dimensional space is, strictly (mathematically) speaking, impossible. In the first embodiment, therefore, in order for strokes entered (into the digitizer 201a) in two dimensional space to be ordered, prescribed points taken from the point sequence constructing each stroke and serving as points representing the stroke are projected in one dimension using a stroke sorting function, and the ordering of each stroke is performed using the order in which the projections were made. Further, though it is assumed here that the stroke sorting function has been stored in, say, the ROM 204a, this does not impose a limitation upon the invention. For example, a configuration may be adopted in which the stroke sorting function is stored on the hard disk accommodated within the hard-disk drive 206.

Next, at step S103, each ordered stroke and its order that have been stored in the RAM 204b are matched with a character recognition dictionary that stores each stroke of all standard characters in accordance with, say, a table of commonly used Chinese characters, as well as the order in which each stroke is projected by the stroke sorting function used at step S102.

This is followed by step S104, at which character recognition of each stroke is completed by matching processing to determine the entered character or character string. The character or character string recognized is displayed as results of recognition on the display unit 202 in accordance with font information and character codes stored in the ROM 204a.

The processing of step S102 will now be described in detail with reference to FIG. 3.

Figure 3:
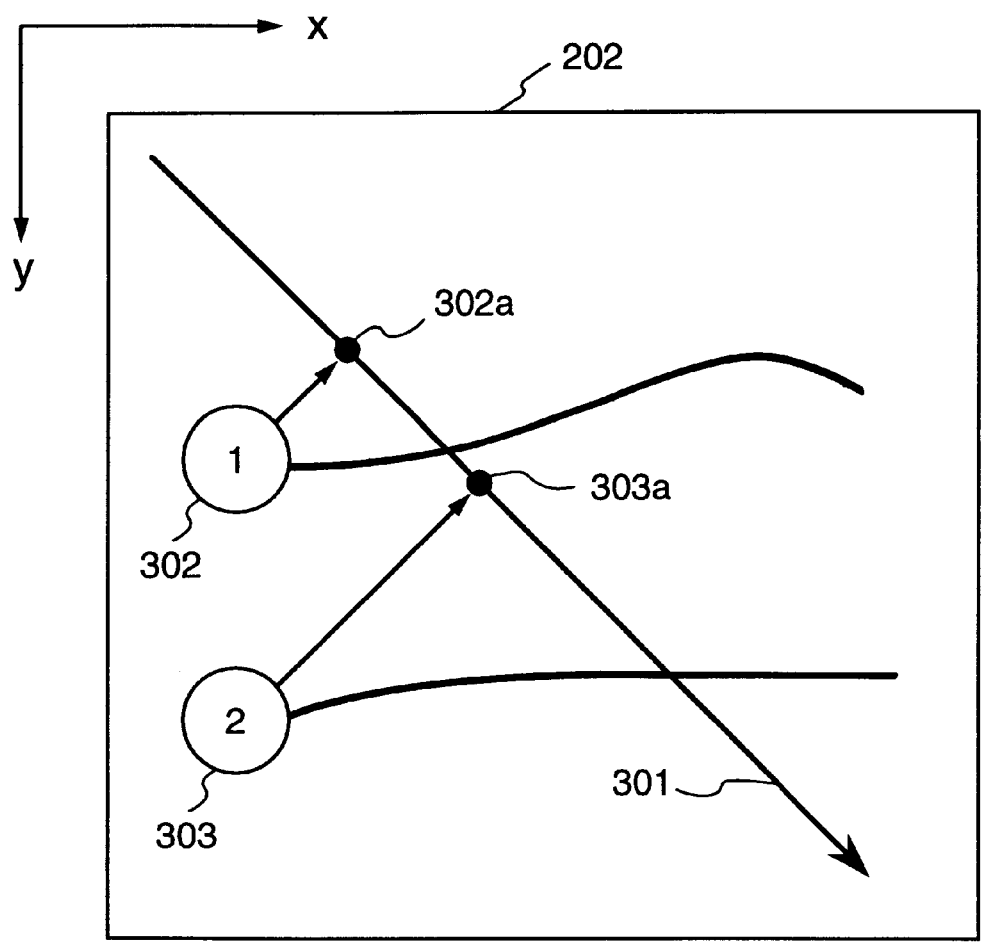
FIG. 3 is a diagram for describing the details of processing of a step S102 according to the first embodiment.

FIG. 3 is a diagram for describing the details of processing of step S102.

By way of example, assume that the user writes the character "=" on the digitizer 201a using the pen 201b, and that the result is that the character "=" of the kind shown in FIG. 3 is displayed on the display unit 202. Further, a coordinate plane of XY coordinates shown in FIG. 3 are defined in the digitizer 201a. As for the stroke sorting function, strokes having starting points the values of which are small on x+y are successively projected onto x+y in the direction in which a vector 301 advances.

As a result, starting points 302, 303 of respective ones of the two strokes constructing the character "=" displayed on the display unit 202 are projected onto x+y so that points 302a, 303a are obtained on x+y. The numerals written at the starting points of the two strokes constructing the character "=" in FIG. 3 indicate the order in which the starting points were projected upon x+y. In a case where the starting points of a plurality of strokes occupy identical positions when projected upon x+y using this stroke sorting function, an order cannot be assigned. In such case it will suffice to determine the order by projecting the starting points of the strokes again using a vector expressed by x−y as the new stroke sorting function.

In the first embodiment, the starting point of each stroke is projected upon a straight line such as x+y as the stroke sorting function. However, this does not impose a limitation upon the invention. For example, the starting point of each stroke on the digitizer 201a may be projected in accordance with concentric circles expressed by polar coordinates (concentric circles) of the kind shown in FIG. 4A. Generally speaking, a plurality of contour lines may be painted on the display unit 202 using a certain curve, as shown in FIGS. 4B and 4C, and the starting point of each stroke on the digitizer 201a may be projected in accordance with the plurality of contour lines.

Figure 4A:
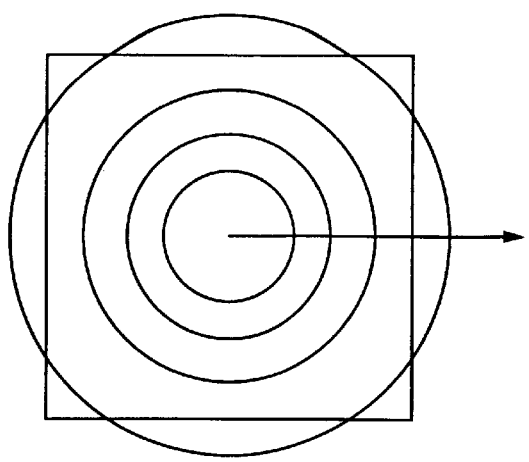
FIGS. 4A to 4C are diagrams illustrating a stroke storing function according to the first embodiment.
Figure 4B:
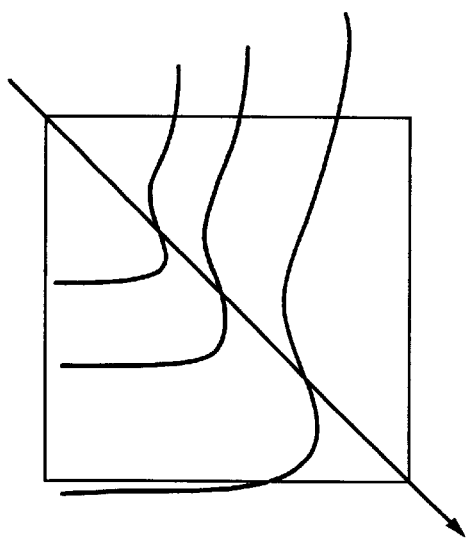
Figure 4C:
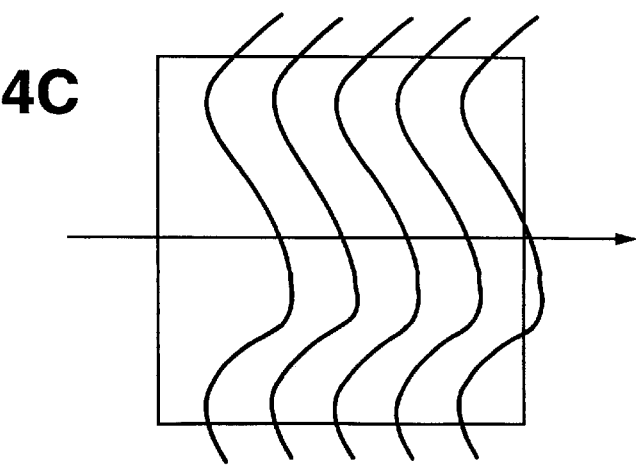

In FIGS. 4A to 4C, the direction of the arrow indicates the direction from higher to lower contour lines. In FIG. 4B, the contour lines are painted by enlarging a given curve, while in FIG. 4C the contour lines are painted by translating the given curve.

In the first embodiment, the starting point of each entered stroke is adopted as the representative value, though this does not impose a limitation upon the invention. For example, instead of the starting point, it is possible to adopt a desired referential point such as the end point, mid-point or centroid as the point representing the position of the entered stroke. Further, the standard of these desired points may be changed depending upon the entered stroke. For example, the starting point may be adopted as the representative point in case of a certain entered stroke and the end point may be adopted as the representative point in case of another entered stroke.

Figure 5A:
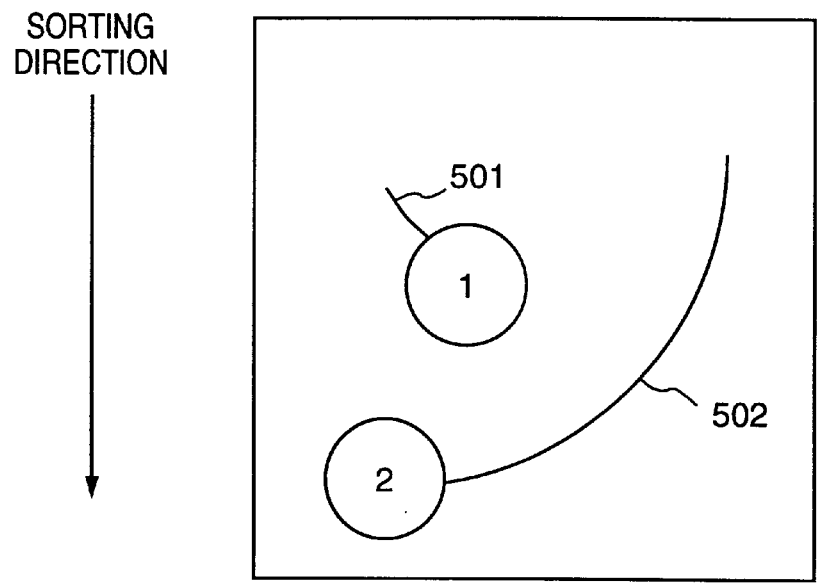
FIGS. 5A and 5B are diagrams for describing processing in a case where a plurality of points are projected by the stroke sorting function of the first embodiment.

Furthermore, in the first embodiment, points representing strokes are selected one point at a time stroke by stroke, and these points are projected in one dimension. However, this does not impose a limitation upon the invention. For example, two or more points may be selected as points representing strokes and the results of projecting these points in one dimension can be used to perform character recognition. For example, FIG. 5A shows an example in which the character "ソ" (one of the two kinds of kana script used for Japanese character writing, called katakana) has been projected using the end points as the representative points of the strokes. In this case, numerals written at the end points of strokes 501, 502 indicate the order decided on the basis of the projected positions. In FIG. 6B, on the other and, the starting and end points (four in total) of each stroke are projected. In this case, four numbers representing order are assigned in accordance with the order of projection. Though a plurality of order numbers are assigned to each stroke, the youngest of these order numbers of each stroke is recognized as being the order of the stroke. For example, the starting point of stroke 502 is first and the end point of this stroke is fourth. Accordingly, the order of stroke 502 is recognized as being first.

The details of the processing of step S103 will be described with reference to FIG. 6.

FIG. 6 is a diagram for describing the details of step S103.

Since the strokes (hereinafter referred to as "dictionary strokes") and the order thereof that have been stored in the recognition dictionary 206a and the entered strokes and the order thereof that have been stored in the RAM 204b have been assigned an order by the same stroke sorting function, an order in accordance with the positional relationship in two dimensions (the positional relationship on the digitizer 201a) and independent of the order in which the strokes were written should have been assigned. The dictionary strokes and the entered strokes are matched on the basis of this order. In actuality, however, occasions on which the stroke sorting function is capable of projecting the prescribed point of each stroke and assigning order in highly stable fashion are rare. For this reason, matching is performed upon allowing the order a suitable latitude.

Figure 6A:
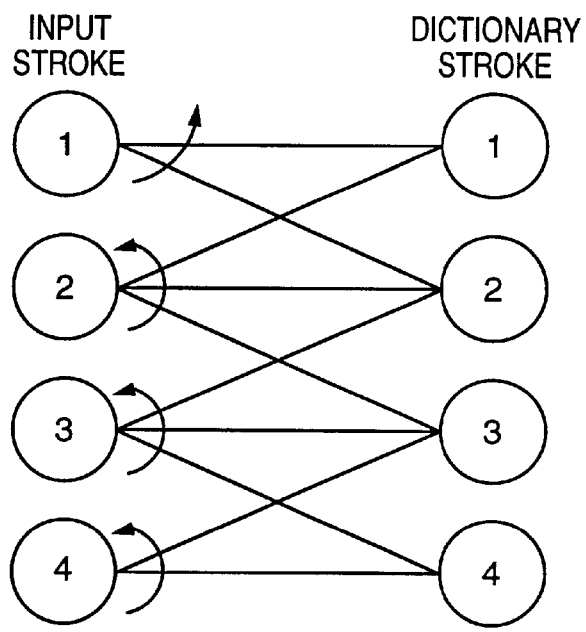
FIGS. 6A and 6B are diagrams for describing matching processing according to the first embodiment.
Figure 6B:
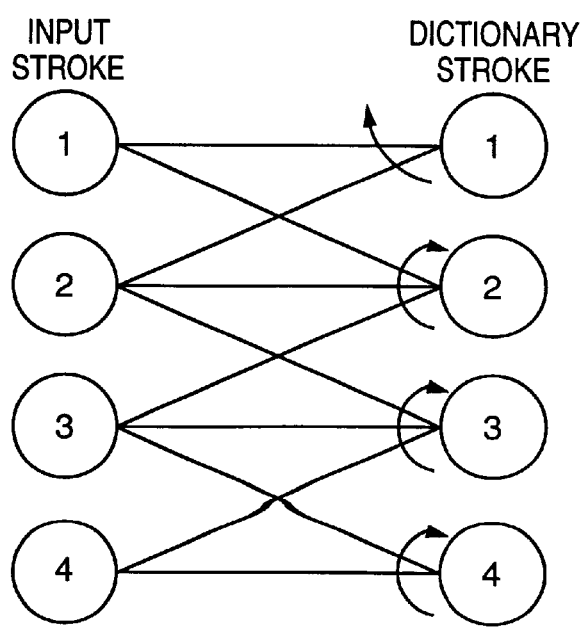

For example, in FIG. 6A, a dictionary stroke and an input stroke which corresponds to an order of the dictionary stroke, an order before and after the dictionary stroke, are matched. In FIG. 6B, on the other hand, an input stroke and a dictionary stroke which corresponds to an order of the input stroke, an order before and after the input stroke, order are matched. As a result, a combination of a stroke and its order giving the best match is decided. Finally, matching frequencies which indicate degree of coincidence relating to all combinations of correlated strokes and orders are totalized. Recognition as a partial pattern, character or character string is made based upon the results of totalization.

In the first embodiment, the suitable latitude given to the order is the order before and after this order. However, this does not impose a limitation upon the invention, as it is unnecessary for the latitude to be fixed in relation to all strokes.

In accordance with the first embodiment, as described above, a representative point of each entered stroke is projected in one dimension in accordance with a stroke sorting function, and the order of the projection and each stroke are stored on a storage medium such as a RAM. On the other hand, a representative point of each stroke constructing a standard character is projected in one dimension in accordance with the same stroke sorting function, and the order of the projection and each stroke are stored in a recognition dictionary. Each stroke of input strokes stored on the storage medium are matched with the recognition dictionary in accordance with the order of each stroke that is not dependent upon the order in which the strokes were written. As a result, character recognition that is independent of the order in which the strokes were written is made possible without sacrificing character recognition rate. Further, in processing for performing matching using the recognition dictionary, an order is assigned to each stroke based upon relative position. Accordingly, character recognition is made possible with a fairly high probability merely by performing matching that is dependent upon order. As a result, the time needed for matching processing can be shortened and, hence, character recognition processing speed can be raised.

<Second Embodiment>

It has been stated in the first embodiment that assigning an order to a point sequence that extends in continuous two-dimensional space (on the digitizer 201a) is, strictly (mathematically) speaking, impossible. However, the two dimensions expressed on the digitizer 201a are not continuous but digital. Accordingly, it is possible to assign an order to a point sequence that extends two dimensionally. More specifically, assigning an order to the digital point sequence of each stroke is achieved by using a stroke sorting function such that regularly arrayed grid-shaped input surfaces expressed by the digitizer 201a are traversed at least one time. Specific examples will be described with reference to FIGS. 7A to 7C. With the exception of aspects relating to assignment of order, the architecture of the character recognition apparatus and the operation regarding matching processing are similar to those of the first embodiment and need not be described again.

Figure 7A:
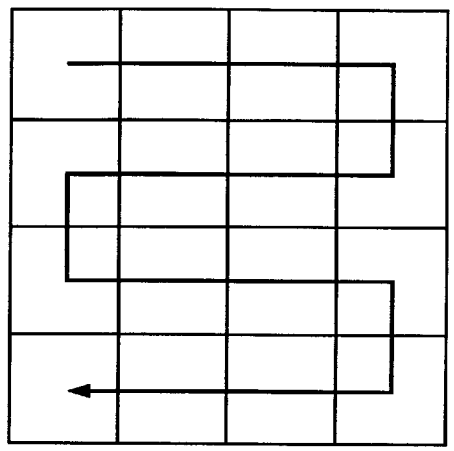
FIGS. 7A to 7C are diagrams for describing processing based upon a stroke sorting function according to a second embodiment of the present invention.
Figure 7B:
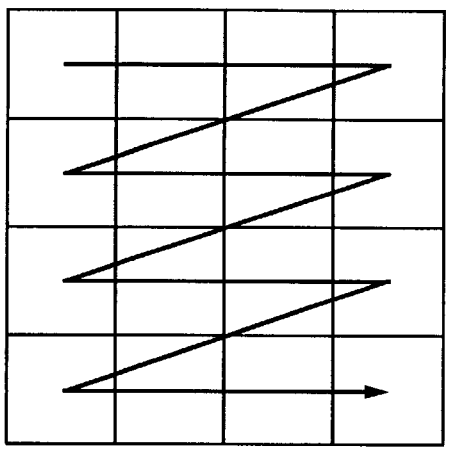

FIG. 7A shows a stroke function which traverses grid-shaped input surfaces at least onetime. In this case, order is assigned whenever a starting point of each stroke is encountered along a line which moves back and forth in the manner illustrated. This makes it possible to assign order to a plurality of strokes present in two-dimensional space. In FIG. 7B, order is assigned whenever a starting point of each stroke is encountered along a zigzag line.

In FIGS. 7A and 7B, the referential direction is from top to bottom. In general, however, it is possible to set a back-and-forth line or a zigzag line using a vector having any direction as a reference, and the type of line for performing the assignment of order is not limited solely to a back-and-forth line and zigzag line.

Figure 7C:
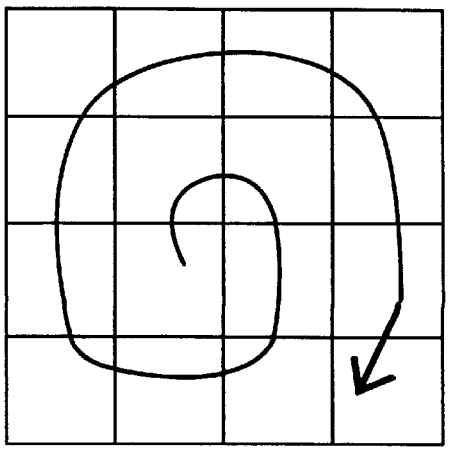

For example, the ordering of the starting point of each stroke present in any grid can be performed along a spiral line, as shown in FIG. 7C.

In accordance with the second embodiment, as described above, it is possible to assign an order to strokes based upon relative position by using a stroke sorting function such that regularly arrayed grid-shaped input surfaces expressed by a digitizer are traversed at least one time. This makes possible character recognition that is independent of the order in which strokes are written.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the embodiments to a system or an apparatus, reading the program codes with a computer (e.g., a CPU or MPU) of the system or apparatus from the storage medium, then executing the program.

In this case, the program codes read from the storage medium realize the functions of the embodiment, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiments.

Furthermore, the present invention further covers a case where, after the program codes read from the storage medium are written in a function extension card inserted into the computer or in a memory provided in a function extension unit connected to the computer, a CPU or the like contained in the function extension card or function extension unit performs a part of or the entire process in accordance with the designation of program codes and implements the function of the above embodiments.

In the case where the present invention is applied to the above-mentioned storage medium, program codes corresponding to the flowchart described earlier are stored on the storage medium. More specifically, modules illustrating an example of the memory map of FIG. 8 are stored on the storage medium.

Specifically, it will suffice to store program codes of at least a holding module 1011, a storage module 1012, a comparison module 1013 and a recognition module 1014 on the storage medium.

The holding module 1011 holds a dictionary which stores strokes of standard characters in a predetermined order based upon relative positional relationship of the strokes. The storage module 1012 stores the plurality of strokes on a storage medium in a predetermined order. The comparison module 1013 compares the plurality of strokes stored on the storage medium and each stroke of the standard characters stored in the dictionary. The recognition module 1014 recognizes a character, which is constructed by the plurality of strokes, based upon results of the comparison.

In accordance with the modules stored on the storage medium, processing is executed in the order of steps S1001 ~S1004, namely hold, store, compare and recognize as shown in FIG. 8. With regard to the modules stored on the storage medium, the hold (step S1001) processing executed by the holding module corresponds to a dictionary held in order to execute the flowchart of FIG. 2. The store (step S1002) processing executed by the storage module corresponds to steps S101 and S102 of the flowchart of FIG. 2. The compare (step S1003) processing executed by the comparison module corresponds to step S103 of the flowchart of FIG. 2. The recognize (step S1004) processing executed by the recognition module corresponds to step S104 and S105 of the flowchart of FIG. 2.

As many apparently widely different embodiments of the present invention can be made without departing from the spirit and scope thereof, it is to be understood that the invention is not limited to the specific embodiments thereof except as defined in the appended claims.

What is claimed is:

1. A character recognition apparatus for recognizing entered characters, comprising:

holding means for holding a dictionary which stores strokes constructing a standard character in accordance with an order in which prescribed points of each stroke of the standard character are projected upon a line;

storage means for storing a plurality of strokes constructing the entered character in accordance with an order in which prescribed points of each stroke of the plurality of strokes are projected upon the line;

matching means for matching strokes constructing the entered character stored in said storage means with strokes constructing the standard character stored in said dictionary in accordance with the order in which the strokes constructing the entered character are stored in said storage means; and recognition means for recognizing a character, which is constructed by the entered plurality of strokes, based upon results of the matching performed by said matching means.

2. The apparatus according to claim 1, wherein said matching means matches the Nth stroke of the entered character stored in said storage means with strokes before and after the Nth stroke of the standard character stored in said dictionary.

3. The apparatus according to claim 1, wherein said line is a predetermined straight line.

4. The apparatus according to claim 1, wherein said prescribed points include at least one of a starting point, an end point, a mid-point and a centroid of a stroke.

5. The apparatus according to claim 1, wherein said line is determined based on a predetermined function.

6. The apparatus according to claim 1, wherein said order is a rule according to which at least two or more points from a sequence of points constructing each stroke of the plurality of strokes are converted to points on a predetermined straight line.

7. A character recognition method for recognizing entered characters, comprising:

- a holding step of holding a dictionary which stores strokes constructing a standard character in accordance with an order in which prescribed points of each stroke of the standard character are projected upon a line;
- a storage step of storing a plurality of strokes constructing the entered character on a storage medium in accordance with an order in which prescribed points of each stroke of the plurality of strokes are projected upon the line;
- a matching step of matching strokes constructing the entered character stored on the storage medium at said storage step with strokes constructing the standard character stored in the dictionary in accordance with the order in which the strokes constructing the entered character are stored in said storage medium; and
- a recognition step of recognizing a character, which is constructed by the entered plurality of strokes, based upon results of the matching performed at said matching step.

8. The method according to claim 7, wherein said matching step matches the Nth stroke of the entered character stored in said storage means with strokes before and after of the Nth stroke of the standard character stored in said dictionary.

9. The method according to claim 7, wherein said line is a predetermined straight line.

10. The method according to claim 7, wherein said prescribed points include at least one of a starting point, an end point, a mid-point and a centroid of a stroke.

11. The method according to claim 7, wherein said line is determined based on a predetermined function.

12. The method according to claim 7, wherein said order is a rule according to which at least two or more points from a sequence of points constructing each stroke of the plurality of strokes are mapped to a predetermined straight line.

13. A computer readable memory storing program codes for character recognition processing, said memory comprising:

- a program code of a holding step of holding a dictionary which stores strokes constructing a standard character in accordance with an order in which prescribed points of each stroke of the standard character are projected upon a line;
- a program code of a storage step of storing a plurality of strokes constructing an entered character on a storage medium in accordance with an order in which prescribed points of each stroke of the plurality of strokes are projected upon the line;
- a program code of a matching step of matching strokes constructing the entered character stored on the storage medium at said storage step with strokes constructing the standard character stored in the dictionary in accordance with an order in which the strokes constructing the entered character are stored on the storage medium; and
- a program code of a recognition step of recognizing a character, which is constructed by the entered plurality of strokes, based upon results of the matching performed at said matching step.

\* \* \* \* \*

UNITED STATES PATENT AND TRADEMARK OFFICE
CERTIFICATE OF CORRECTION

| | |
|---|---|
| PATENT NO. | : 6,212,298 B1 |
| DATED | : April 3, 2001 |
| INVENTOR(S) | : Hiroto Yoshii et al. |

Page 1 of 1

Figure 5B:
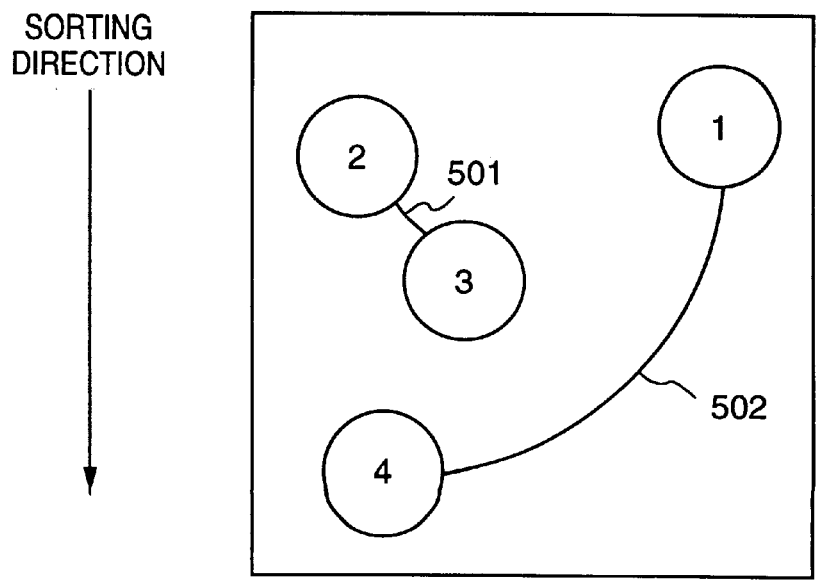

It is certified that error appears in the above-identified patent and that said Letters Patent is hereby corrected as shown below:

<u>Column 5,</u>
Line 51, "FIG. 6B," should read -- FIG. 5B, --.

Signed and Sealed this

Nineteenth Day of February, 2002

*Attest:*

*Attesting Officer*

JAMES E. ROGAN
*Director of the United States Patent and Trademark Office*